(12) United States Patent
Eistein et al.

(10) Patent No.: US 12,526,027 B2
(45) Date of Patent: Jan. 13, 2026

(54) NETWORK NODE ANTENNA GROUPING FOR POWER REDUCTION ON UE

(71) Applicant: QUALCOMM Incorporated, San Diego, CA (US)

(72) Inventors: Yaniv Eistein, Tel Aviv (IL); Ronen Shaked, Kfar Saba (IL); Amit Moses, Tel Aviv (IL); Aviv Regev, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/335,063

(22) Filed: Jun. 14, 2023

(65) Prior Publication Data
US 2024/0421878 A1    Dec. 19, 2024

(51) Int. Cl.
  *H04B 7/06*    (2006.01)
(52) U.S. Cl.
  CPC ......... *H04B 7/0639* (2013.01); *H04B 7/0626* (2013.01)
(58) Field of Classification Search
  CPC .. H04B 7/0639; H04B 7/0626; H04B 7/0628; H04B 7/0691
  See application file for complete search history.

(56) References Cited

U.S. PATENT DOCUMENTS

| | | | | |
|---|---|---|---|---|
| 11,258,648 B1* | 2/2022 | Landis | ................. | H04W 72/23 |
| 2010/0202560 A1* | 8/2010 | Luo | ..................... | H04B 7/0691 |
| | | | | 375/295 |
| 2014/0369291 A1* | 12/2014 | Zhang | ................... | H04B 7/024 |
| | | | | 370/329 |
| 2016/0149680 A1* | 5/2016 | Kang | .................. | H04B 7/0639 |
| | | | | 370/329 |
| 2025/0080176 A1* | 3/2025 | Zhang | ................... | H04B 7/024 |

OTHER PUBLICATIONS

International Search Report and Written Opinion—PCT/US2024/028586—ISA/EPO—Oct. 2, 2024.

* cited by examiner

*Primary Examiner* — Jung H Park
(74) *Attorney, Agent, or Firm* — Procopio, Cory, Hargreaves & Savitch LLP

(57) ABSTRACT

Apparatus, methods, and computer program products for wireless communication are provided. An example method may include transmitting, to a network node, information associated with a first quantity of effective downlink transmit (Tx) antennas associated with the UE. The example method may further include receiving, from the network node, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. The example method may further include receiving, from the network node, a second transmission based on the set of precoding functions.

28 Claims, 11 Drawing Sheets

NETWORK NODE ANTENNA GROUPING FOR POWER REDUCTION ON UE

TECHNICAL FIELD

The present disclosure relates generally to communication systems, and more particularly, to wireless communication systems with antennas.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on stored information that is stored in the at least one memory, the at least one processor is configured to cause the apparatus to transmit, to a network node, information associated with a first quantity of effective downlink transmit (Tx) antennas associated with the UE. Based at least in part on stored information that is stored in the at least one memory, the at least one processor is configured to cause the apparatus to receive, from the network node, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. Based at least in part on stored information that is stored in the at least one memory, the at least one processor is configured to cause the apparatus to receive, from the network node, a second transmission based on the set of precoding functions.

In another aspect of the disclosure, a method, a computer-readable medium, and an apparatus at a network entity are provided. The apparatus may include at least one memory and at least one processor coupled to the at least one memory. Based at least in part on stored information that is stored in the at least one memory, the at least one processor is configured to cause the apparatus to receive information associated with a first quantity of effective downlink Tx antennas associated with a UE. Based at least in part on stored information that is stored in the at least one memory, the at least one processor is configured to cause the apparatus to transmit, for the UE, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. Based at least in part on stored information that is stored in the at least one memory, the at least one processor is configured to cause the apparatus to transmit, for the UE, a second transmission based on the set of precoding functions.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
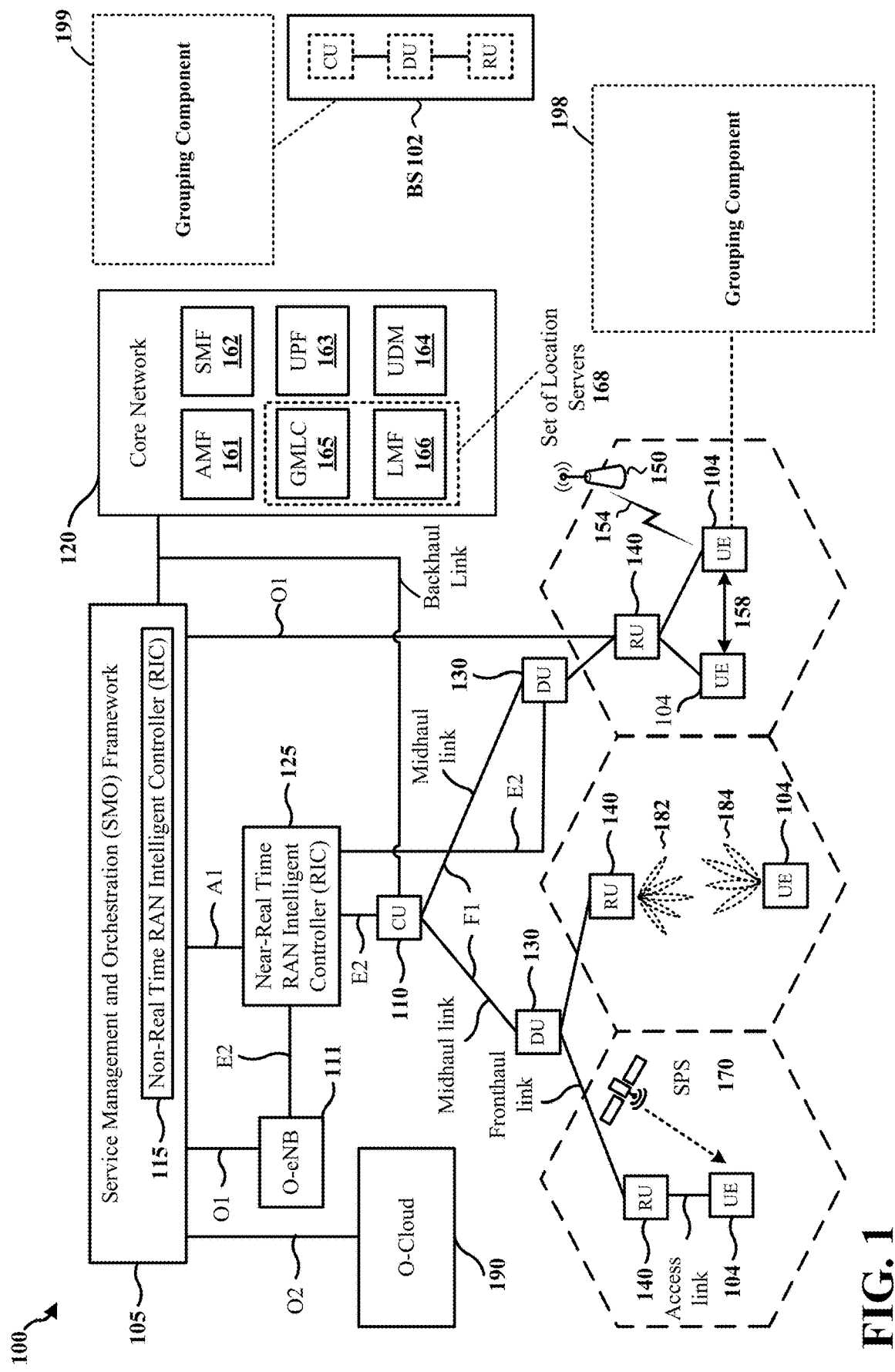
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (NB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

To reduce the power consumption by the power amplifiers (PAs) while still maintaining its output power, a network node may lower the PAs' supply voltage while working with less back off from the PA maximal voltage, which incurs higher non-linearity (NL) on the transmitted signal. The non-linearity may be addressed by the UE receiver by utilizing digital post distortion algorithm (DPoD). DPoD is an algorithm used at the receiver to estimate and correct non-linearity, which may be separately performed for each Tx antenna. As the quantity of Tx antenna increases DPoD algorithm at the UE may have increased implementation complexity (mainly number of fast Fourier transform (FFT)/inverse fast Fourier transform (IFFT)) which translates into higher UE power consumption, and may also have higher algorithmic estimation complexity, which involves the demand for estimating more coefficients (both the PA's and the channel), which may in turn translate into using a signal with more pilots, which may lead to loss of bandwidth dedicated for data transmission. Aspects provided herein enable grouping of Tx antennas, where a network node applies a same precoding function over a group of antenna, so that the effective number of Tx antennas at the UE may decrease based on the grouping size, resulting in the associated DPoD complexity at the UE side to be decreased.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a grouping component 198. In some aspects, the grouping component 198 may be configured to transmit, to a network node, information associated with a first quantity of effective downlink Tx antennas associated with the UE. In some aspects, the grouping component 198 may be further configured to receive, from the network node, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, the grouping component 198 may be further configured to receive, from the network node, a second transmission based on the set of precoding functions.

In certain aspects, the base station 102 may include a grouping component 199. In some aspects, the grouping component 199 may be configured to receive information associated with a first quantity of effective downlink Tx antennas associated with a UE. In some aspects, the grouping component 199 may be further configured to transmit, for the UE, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, the grouping component 199 may be further configured to transmit, for the UE, a second transmission based on the set of precoding functions.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
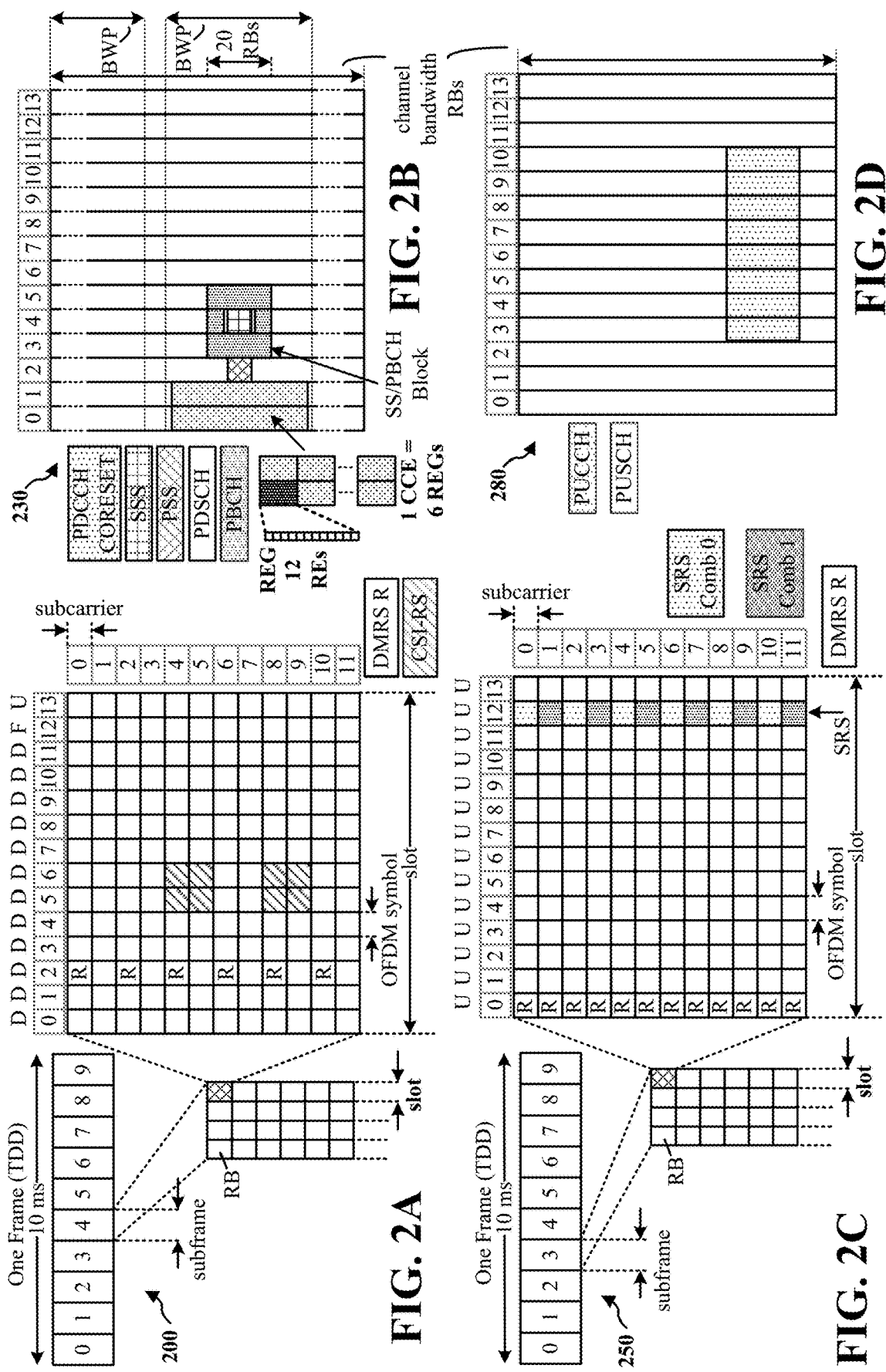
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
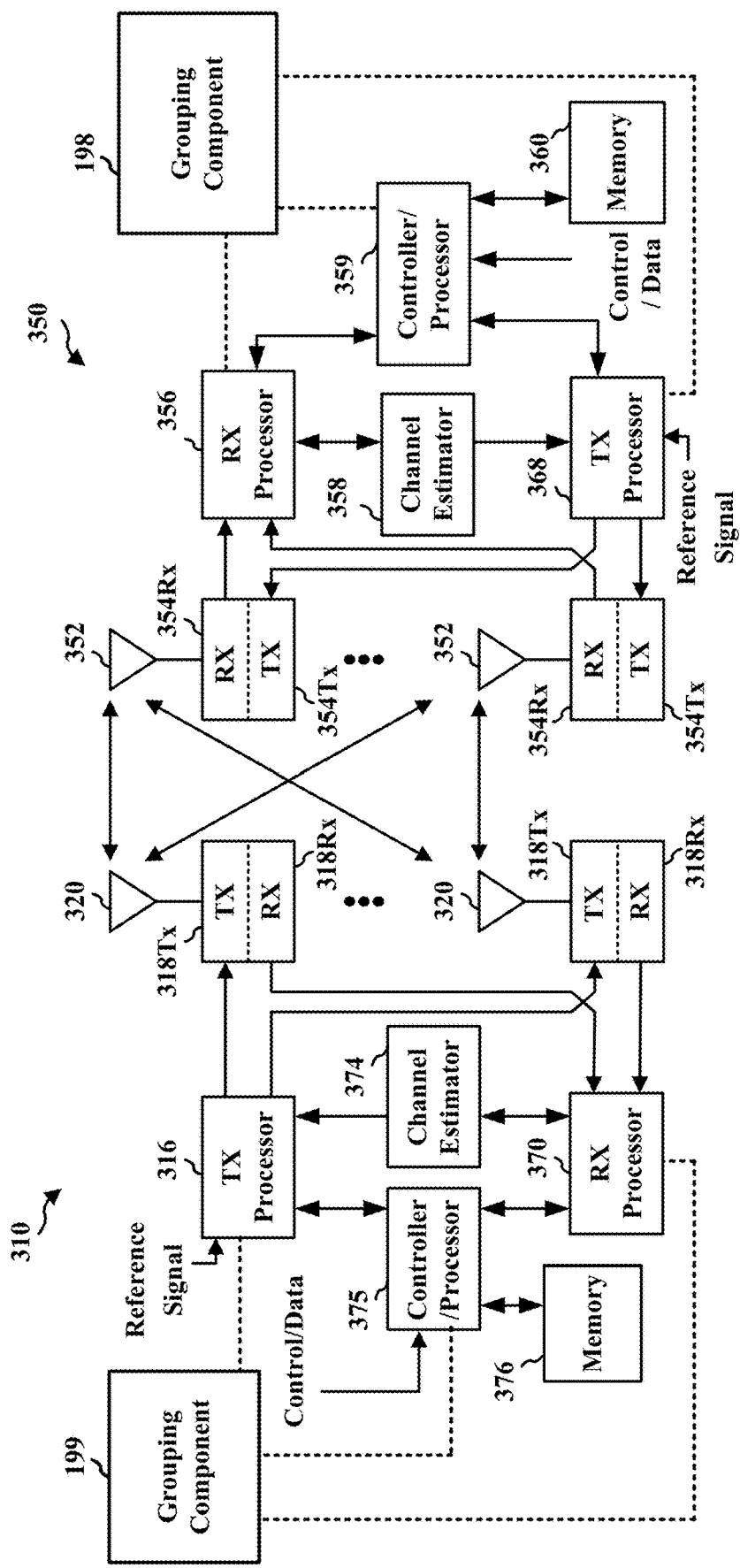
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with grouping component 198 of FIG. 1.

At least one of the TX processor 316, the RX processor 370, and the controller/processor 375 may be configured to perform aspects in connection with grouping component 199 of FIG. 1.

PAs may be major contributors to the overall TX power consumption. For example, the PA may be responsible for, e.g., 50%-70% of the overall base station power consumption. In order to save power and/or enable more power efficient operating modes, various PA power supply adaptation modes may be used.

Figure 4:
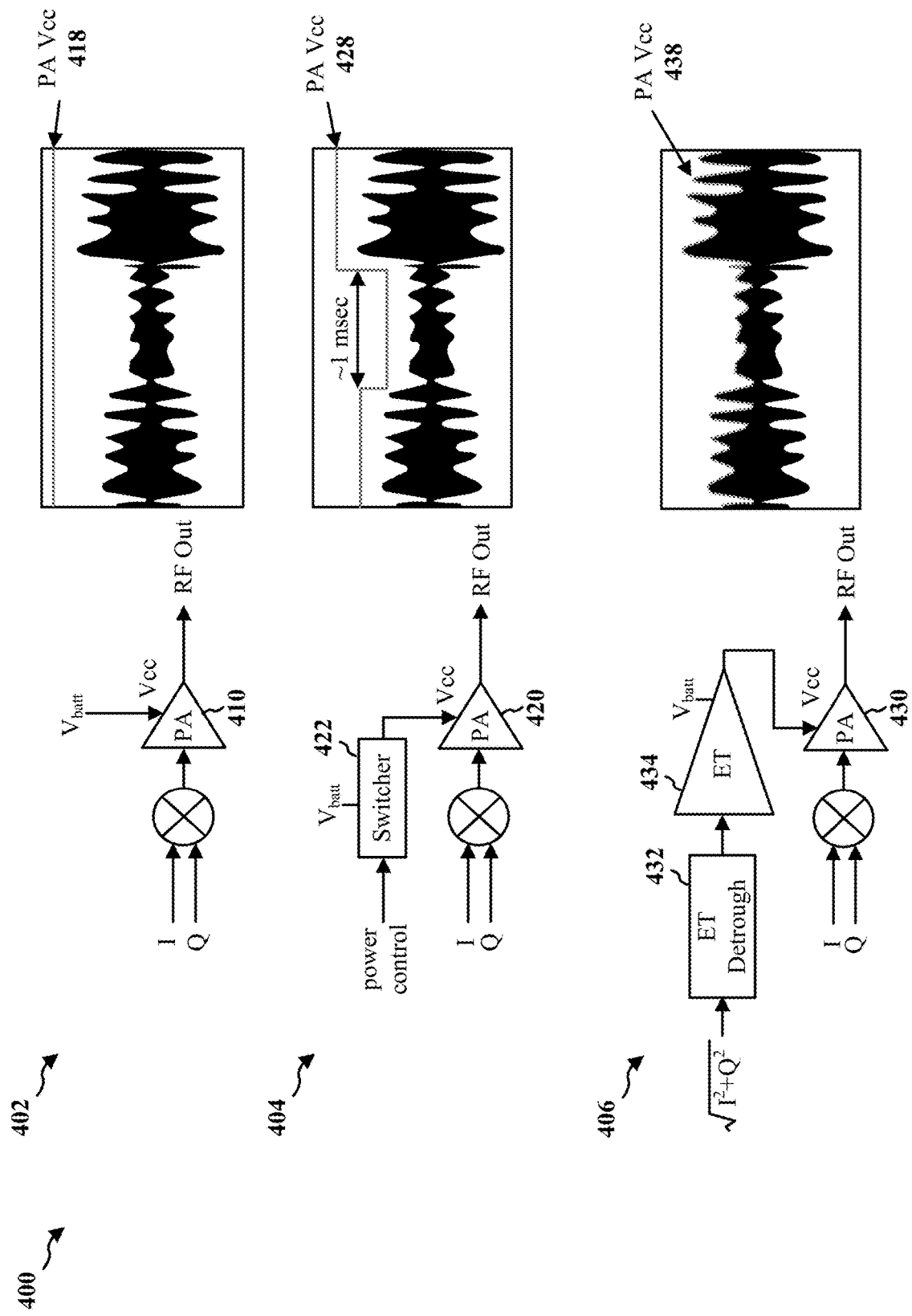
FIG. 4 is a diagram illustrating various example power amplifier (PA) power supply adaptation modes, in accordance with various aspects of the present disclosure.

FIG. 4 is a diagram 400 illustrating various example PA power supply adaptation modes. The diagram 402 illustrates the direct battery power supply mode. While operating in the direct battery power supply mode, the wireless device (e.g., the base station) may not apply an efficient bias to the PA 410. For example, the battery voltage (e.g., $V_{batt}$) may be directly provided as a fixed PA supply voltage 418 (e.g., $V_{CC}$) for the PA 410 to amplify an upconverted RF signal (which may include an in-phase (I) component and a quadrature (Q) component) regardless of the signal to be amplified. As the PA supply voltage 418 may be greater than the signal peaks of the RF signal to be amplified, to avoid clipping, the battery voltage of the wireless device in the direct battery power supply mode may be a constant high value. As a result, excess current may be drawn in the PA 410 and dissipated as wasted energy when the PA 410 operates in the direct battery power supply mode. Accordingly, the direct battery power supply mode may provide little or no reduction in the power consumed by the PA and may have some non-linearity, which may result in wasted power.

The diagram 404 illustrates the average power tracking (APT) mode and/or the enhanced power tracking (EPT) mode. APT and/or EPT may reduce power wastage by the PA 420, as compared to the direct battery power supply mode, by adjusting the supply voltage 428 to the PA 420 (e.g., $V_{CC}$) (e.g., at a switcher unit 422) based on the transmit power of the signal to be amplified on, for example, a per slot or per subframe basis. For instance, as illustrated, the supply voltage 428 to the PA 420 may be adjusted at a finite time granularity of every millisecond (ms). In the APT mode, the supply voltage 428 to the PA 420 may be adjusted based on the average transmit power of the signal to be amplified. In this manner, the supply voltage 428 to the PA 420 may cause the PA 420 to operate close to the compression point, thereby improving efficiency. During the APT mode of operation, the PA 420 may operate in a linear mode of operation, with the bias to the PA 420 varying as a function of the transmit power.

The EPT mode may further reduce wasted power and increase efficiency of the PA 420 compared to the APT mode. Operations in the EPT mode may also involve adjusting the PA supply voltage 428 based on the average transmit power of the RF signal to be amplified, similar to in APT mode. However, in the EPT mode, the PA supply voltage 428 (e.g., $V_{CC}$) may be reduced to below the compression point of the PA 420. This may cause a loss of linearity at the PA 420. The EPT mode operation may adjust for this distortion/non-linearity using digital pre-distortion. In an EPT mode, the wireless device (e.g., the base station) may operate in a compressed mode and the linearity may be corrected by applying digital pre-distortion.

The diagram 406 illustrates the ET power supply mode. Operations in the ET mode may save more power than each of the direct battery mode, the APT mode, or the EPT mode. The ET mode may use the envelope of the signal to be amplified to control the supply voltage 438 to the PA 430 (e.g., $V_{CC}$). In particular, the signal to be amplified may be fed into an ET detroughing unit 432, which may prevent $V_{CC}$ from dropping down to zero volts. Therefore, a minimum supply voltage may be ensured at the PA 430. The output of the ET detroughing unit 432 may be fed into the ET unit 434, which may generate the supply voltage 438 to the PA 430 based on ET. The bias to the PA 430 may closely, continuously, and instantaneously track the envelope of the signal to be amplified.

To apply the ET power supply mode to the amplification of large bandwidth signals (e.g., wideband signals), limited bandwidth ET techniques may be utilized. In particular, the envelope of a wideband signal may be approximated with a limited bandwidth envelope, and the limited bandwidth envelope may be used as a basis for the PA supply voltage 438 based on ET techniques. The limited bandwidth ET techniques may be associated with a certain amount of residual distortion or non-linearity in the amplified signals. Such residual distortion may be compensated for at the receiver side using digital post-distortion (DPoD) techniques.

As described above, the use of the limited bandwidth ET on the TX side may result in distortion. The distortion may increase as the ET becomes more band-limited. The distortion may be corrected using DPoD techniques on the RX side. The DPoD techniques may be based on modeling the non-linearity impairment as an additive signal. In other words, the non-linearity may be estimated, and may be subtracted from the received signal (e.g., through an iterative process) at the RX side based on a non-linearity model. Therefore, to accomplish DPoD, if the source of the non-linearity is limited to the PA, a PA non-linearity model may be estimated, and may be used in connection with the DPoD techniques to obtain the corrected signal at the RX side.

In some aspects, the PA non-linearity model may be described as a function of the PA input x, i.e., y=PA(x), and may be estimated on the RX side based on one or more dedicated RSs (e.g., pilots) sent from the TX side. However, when the ET process is also a contributor to the non-linearity, the non-linearity model may be different as the non-linearity model may be a function of the reduced bandwidth envelope $E_{nb}$ in addition to being a function of the PA input x, namely: y=PA(x, $E_{nb}$). The specific form of the reduced bandwidth envelope $E_{nb}$ may affect the amount of distortion produced by the PA.

In order to estimate the combined PA and ET non-linearity model, suitable pilots may be designed. The design of the pilots may take into account the bandwidth limitations of the ET circuitry and the non-linearity model estimation capability of the receiver. Accordingly, the TX side (e.g., a base station) may transmit dedicated signaling messages and/or pilots to the RX side (e.g., a UE). The RX side may estimate the combined PA and ET non-linearity model based on the received signaling messages and/or pilots.

To reduce the power consumption by the power amplifiers (PAS) while still maintaining its output power, a network node may lower the PAs' supply voltage while working with less back off from the PA maximal voltage, which incurs higher non-linearity (NL) on the transmitted signal. The non-linearity may be addressed by the UE receiver by utilizing digital post distortion algorithm (DPoD). DPoD is an algorithm used at the receiver to estimate and correct non-linearity, which may be separately performed for each Tx antenna. As the quantity of Tx antenna increases DPoD algorithm at the UE may have increased implementation complexity (mainly number of FFT/IFFTs) which translates into higher UE power consumption, and may also have higher algorithmic estimation complexity, which involves the demand for estimating more coefficients (both the PA's and the channel), which may in turn translate into using a signal with more pilots, which may lead to loss of bandwidth dedicated for data transmission. Aspects provided herein enable grouping of Tx antennas, where a network node applies a same precoding function over a group of antennas, so that the effective number of Tx antennas at the UE may decrease based on the grouping size, resulting in the associated DPoD complexity at the UE side to be decreased.

As used herein, the term "effective downlink Tx antenna" may refer to a Tx antenna or a group of antennas of a network node that is used for transmitting a transmission to a UE based on a same precoding function. As used herein, the term "precoding function" may refer to a precoder that is based on a precoder multiplied by a phase only value. As used herein, the term "antenna grouping" may be a procedure of associating multiple antennas with a same precoding function to form a group of multiple antennas. For antennas within a same group of multiple antennas, a same precoding function may be used. Antenna grouping may be used in order to reduce the number of estimated variables, and the number of implemented FFT/IFFT. Each antenna within the group of multiple antennas may be associated with a respective precoder that is based on a base precoder multiplied by a phase only value. The process of multiplying each precoder associated with respective antennas within the group by a wideband phase only value may be referred to as "derotation." The derotation procedure may be done by looking at the angle of the correlation between each group member and the group leader, and correcting it. For example, the multiplication may be a wideband by phase: $e^{2\pi j \cdot \phi}$. For group g and internal group member z: $\phi$=angle $(C(T_{g,z}, T_{g,1}))$.

Within the group of multiple antennas, there may be a group leader that may be using the base precoder. In some aspects, a group leader may be chosen sequentially where the network may choose each group leader so that its correlation maximum with all the previously chosen group leaders, is minimal; then choose group members of each group. In some aspects, the network may move from one group to the last by choosing the group leader then the group members such that each group member's correlation with the group leader is maximum. In some aspects, each group of antennas may use a respective precoding function. In some aspects, the term "a first quantity of effective downlink Tx antennas associated with the UE" may refer to a maximum quantity of effective downlink Tx antennas supported (e.g., or requested) by the UE.

DPoD is a receiver algorithm for cancelling non-linearities (NL). DPoD may be based on the assumption that the NL for each Tx antenna, may be approximated as a sum of polynomials (or kernels), each multiplied by a coefficient. The NL estimation may be done based on the DMRS, and assuming that the NL changes slow enough, the estimated NL coefficients may be used to remove the NL from the PDSCH. An example frequency domain precoder application and IFFT may be represented by:

$$x_t(n) = \mathcal{F}^{-1}\left\{\sum_{s=1}^{S} S_s(m) \cdot P_{t,s}(m)\right\} \text{ and } y_r(m) = \sum_{t=1}^{T} \underbrace{H_{r,t}(m)c_{t,1}}_{\text{channel Estimation}} X_t(m) +$$

$$\sum_{t=1}^{T} H_{r,t}(m)\mathcal{F}\overbrace{\{\underline{c_{t,1}}(x_t(n))|x_t(n)|^2 + \underline{c_{t,3}}(x_t(n))|x_t(n)|^4 + \ldots\}|_m}^{\text{Non linearity}} \cdot c_{t,2} \text{ and } c_{t,3}$$

may be the NL coefficients. The NL coefficients that may be estimated may be $c_{t,k}$ for every t and k. where t is the index of Tx antenna, and k is the index of non-linear kernels. Therefore, the total quantity of coefficients to be estimated may be equal to the quantity of Tx antennas multiplied by the quantity of kernels. In addition, the channel $h_{r,t}(m)$ my be estimated for every r, t and m. Based on a time-model with limited delay spread with length D (D taps to be estimated in time-domain), the number of coefficients to be estimated is equal to:

$$N_{rx} \cdot N_{tx} \cdot D$$

In terms of cancellation, the quantity of (oversampled) FFTs and IFFTs may affect complexity and power usage. The IFFT count may be: $x_t(n)=\mathcal{F}^{-1}\{\sum_{s=1}^{S}S_s(m)\cdot P_{t,s}(m)\}$. IFFT may be done for every antenna t so $N_{tx}$ IFFTs may be performed. The FFT count may be $NL_t(m)=\mathcal{F}\{c_{t,2}(x_t(n))|x_t(n)|^2+c_{t,3}(x_t(n))|x_t(n)|^4+\ldots\}|_m$. FFT may be done for every antenna t so $N_{tx}$ FFTs may be performed. Therefore, there may be $2N_{tx}$ quantity of FFTs and IFFTs. To reduce the quantity of FFTs and IFFTs, aspects provided herein may use antenna grouping. Antenna grouping may be used in order to reduce the number of estimated variables, and the number of implemented FFT/IFFT. Each antenna within the group of multiple antennas may be associated with a respective precoder that is based on a base precoder multiplied by a phase only value. The precoders associated with a same precoding function may be the same up to a phase constant (e.g., the wideband phase only value) across the used bandwidth (BW). If the grouped Tx antennas are now re-indexed as: $\{T_{1,1}, T_{1,2}, \ldots, T_{1,Z}\}, \{T_{2,1}, T_{2,2}, \ldots, T_{2,Z}\}, \ldots, \{T_{Mtx,1}, T_{Mtx,2}, \ldots, T_{Mtx,Z}\}$, where the first index denotes the group number, and the second one denotes the member number inside the group. On antenna $T_{g,z}$, there may be a transmission represented by: $x_{g,z}(n)=\mathcal{F}^{-1}\{\sum_{s=1}^{S}S_s(m)\cdot(P_{g,s}(m)e^{2\pi j\phi_{g,z}})\}$. For example, on $T_{1,1}$ antenna, $x_{1,1}(n)=\mathcal{F}^{-1}\{\sum_{s=1}^{S}S_s(m)\cdot(P_{1,s}(m)e^{2\pi j\phi_{1,1}})\}$ is being transmitted, on $T_{1,2}$ antenna, which is on the same group, a same precoding function (with precoders that may differ by a constant phase across the BW) is being used: $x_{1,2}(n)=\mathcal{F}^{-1}\{\sum_{s=1}^{S}S_s(m)\cdot(P_{1,s}(m)e^{2\pi j\phi_{1,2}})\}$, etc.,.

The received signal after experiencing NL and passing through the channel based on the antenna grouping may be: $y_r(m)=\sum_{g=1}^{Mtx}\sum_{k=1}^{K}\tilde{H}_{r,g,k}(m)F\{(\tilde{x}_g(n))|\tilde{x}_g(n)^{2k-2}\}|_m$, where $\tilde{x}_g(n)=\mathcal{F}^{-1}\{\sum_{s=1}^{S}S_s(m)\cdot P_{g,s}(m)\}$, and $\tilde{H}_{r,g,k}(m)$ is an effective channel over kernel k, group g and receive antenna r. The quantity of coefficients that would be estimated may be equal to: $N_{rx}\cdot M_{tx}\cdot K\cdot D$. Therefore, the IFFT count may be IFFT count: $x_t(n)=\mathcal{F}^{-1}\{\sum_{s=1}^{S}S_s(m)\cdot P_{g,s}(m)\}$. The IFFT may be done for every antenna group g and may equal to $M_{tx}$ IFFTs. $NL_r(m)=\sum_{g=1}^{Mtx}\sum_{k=1}^{K}\tilde{H}_{r,g,k}(m)\mathcal{F}\{(\tilde{x}_g(n))|\tilde{x}_g(n)|^{2k-2}\}|_m$. FFT may be done separately for every kernel k and for every antenna t and may be equal to $(K-1)\cdot M_{tx}$ FFTs. Therefore, the total quantity of FFTs and IFFTs with antenna grouping may be equal to $M_{tx}\cdot K$. For the amount of estimated NL coefficients, without antenna grouping, the total quantity may be $N_{tx}\cdot K+N_{rx}\cdot N_{tx}\cdot D$. With antenna grouping, the total quantity may be $N_{rx}\cdot M_{tx}\cdot K\cdot D$, which may be much smaller. For the amount of FFT+IFFT, without antenna grouping, the total quantity may be $2N_{tx}$. With antenna grouping, the total quantity may be $M_{tx}\cdot K$, which may also be much smaller.

As an example, there may be a total of 64 Tx antennas. The 64 antennas may be grouped into 8 groups and the kernel quantity may be 3. The number of FFTs and IFFTs to process a transmission based on the 64 antennas without antenna grouping may be 2*64=128, and the number of FFTs and IFFTs to process a transmission based on the 64 antennas without antenna grouping may be 3*8=24. The number of coefficients to be estimated without antenna grouping may be 5312 (with D=10 taps to be estimated in time-domain), and the number of coefficients to be estimated with antenna grouping may be 1920.

As another example, there may be a total of 64 Tx antennas. The 64 antennas may be grouped into 8 groups and the kernel quantity may be 2. The number of FFTs and IFFTs to process a transmission based on the 64 antennas without antenna grouping may be 2*64=128, and the number of FFTs and IFFTs to process a transmission based on the 64 antennas without antenna grouping may be 2*8=16. The number of coefficients to be estimated without antenna grouping may be 5248 (with D=10 taps to be estimated in time-domain), and the number of coefficients to be estimated with antenna grouping may be 1280.

As another example, there may be a total of 128 Tx antennas. The 128 antennas may be grouped into 16 groups and the kernel quantity may be 2. The number of FFTs and IFFTs to process a transmission based on the 128 antennas without antenna grouping may be 2*128=256, and the number of FFTs and IFFTs to process a transmission based on the 126 antennas without antenna grouping may be 2*16=32. The number of coefficients to be estimated without antenna grouping may be 10496 (with D=10 taps to be estimated in time-domain), and the number of coefficients to be estimated with antenna grouping may be 2560.

To determine the antenna grouping, correlation calculation for fading channels may be performed based on:

$$C(tx2, tx1) = \frac{\Sigma_m \Sigma_{rx} h^*_{rx,tx1}(m) \cdot h_{rx,tx2}(m)}{\sqrt{\Sigma_m \Sigma_{rx} |h_{rx,tx1}(m)|^2 \Sigma_m \Sigma_{rx} |h_{rx,tx2}(m)|^2}}.$$

Grouping may be done by examining the absolute value of the correlation |C(tx2, tx1)| for different pairs of tx1, tx2. The grouping may be based on attempting to maximize correlation within each group. In some aspects, group leaders may be chosen sequentially (e.g., by the network) where each group leader is chosen, so that its correlation maximum with all the previously chosen group leaders, is minimal. In some aspects, the network may move from one group to the last, periodically, and choose one (free up until now) member, so that its correlation with the group leader is maximal, and perform the choice for $M_{tx}-1$ times until all group members positions are filled. The rearranged Tx antennas may be re-indexed as: $\{T_{1,1}, T_{1,2}, \ldots, T_{1,Z}\}, \{T_{2,1}, T_{2,2}, \ldots, T_{2,Z}\}, \ldots, \{T_{Mtx,1}, T_{Mtx,2}, \ldots, T_{Mtx,Z}\}$.

The process of multiplying each precoder associated with respective antennas within the group by a wideband phase only value (which may be otherwise referred to as constant phase) may be referred to as "derotation." The derotation procedure may be done by looking at the angle of the correlation between each group member and the group leader, and correcting it. For example, the multiplication may be a wideband by phase: $e^{2\pi j \cdot \phi}$. For group g and internal group member z: $\phi = \text{angle}(C(T_{g,z}, T_{g,1}))$.

Figure 5:
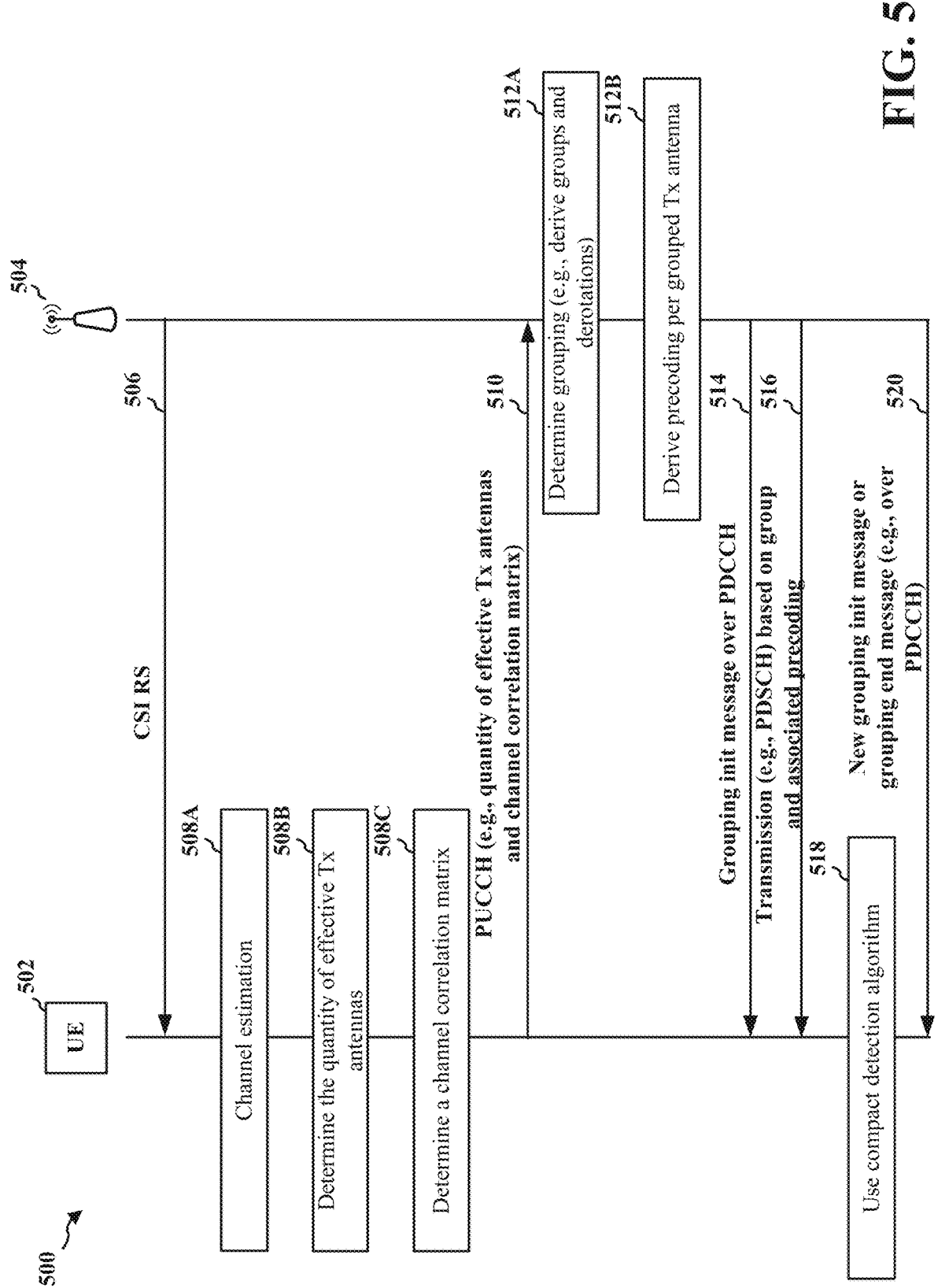
FIG. 5 is a diagram illustrating example communications between a network node and a UE, in accordance with various aspects of the present disclosure.

FIG. 5 is a diagram 500 illustrating example communications between a network node 504 and a UE 502, in accordance with various aspects of the present disclosure.

As illustrated in FIG. 5, the network node 504 may transmit a set of CSI RS 506 to the UE 502. Based on the set of CSI RS 506, the UE 502 may estimate the downlink physical channel at 508A. The UE 502 may then determine, at 508B the maximal number of effective downlink (network) Tx-Antennas ($M_{tx}$) that the UE may take into consideration when receiving a PDSCH, based on the UE 502's power or capability. The UE 502 may then determine, at 508C, a channel correlation matrix C(tx2, tx1). The UE 502 may then send a message 510, which may be a PUCCH, that includes information indicative of the channel correlation matrix C(tx2, tx1), and the maximal number of effective Tx antennas over the PDSCH ($M_{tx}$), to the network node 504. Based on a grouping algorithm, and the received channel correlation matrix C(tx2, tx1), and the maximal number of effective Tx antennas over the PDSCH ($M_{tx}$), the network node 504 may determine the grouping associated with the Tx antennas at the network node 504 at 512A. The network node 504 may perform antenna grouping such that each Tx antenna at the network node 504 is associated with a group. For example, if there are 64 Tx antennas at the network node 504, each of the 64 Tx antennas may be grouped (such as for a total of 8 groups). At 512B, the network node 504 may determine (e.g., calculate) precoding function (e.g., and precoder and phase only values) for each antenna group (e.g., and precoder and phase only value for each antenna). The network node 504 may transmit a grouping initialization message 514 (grouping init), which may be over a PDCCH or a different type of signaling, to the UE 502. The grouping initialization message 514 may include information indicative of (e.g., a list of) the precoding functions (e.g., and associated antenna groups), which may be associated with physical resource block group (PRG) size and $M_{tx}$, and the number of slots after which the grouping and the precoding functions may be effective. The network node 504 may then start using the derived precoding functions and antenna groups for transmission of PDSCH, such as transmission 516 based on the group and associated precoding functions. At 518, based on the received grouping initialization message 514 and the information, the UE 502 may switch to a compact detection algorithm based on the grouped antennas known to the UE 502. The network node 504 may continue to use the grouping and associated precoding functions, and the UE may continue to process the incoming transmissions based on the information in the received grouping initialization message 514, until the network node 504 transmits a grouping end message (which may include the number of slots after which the current grouping ends) or a new grouping initialization message to end the current grouping.

Figure 6:
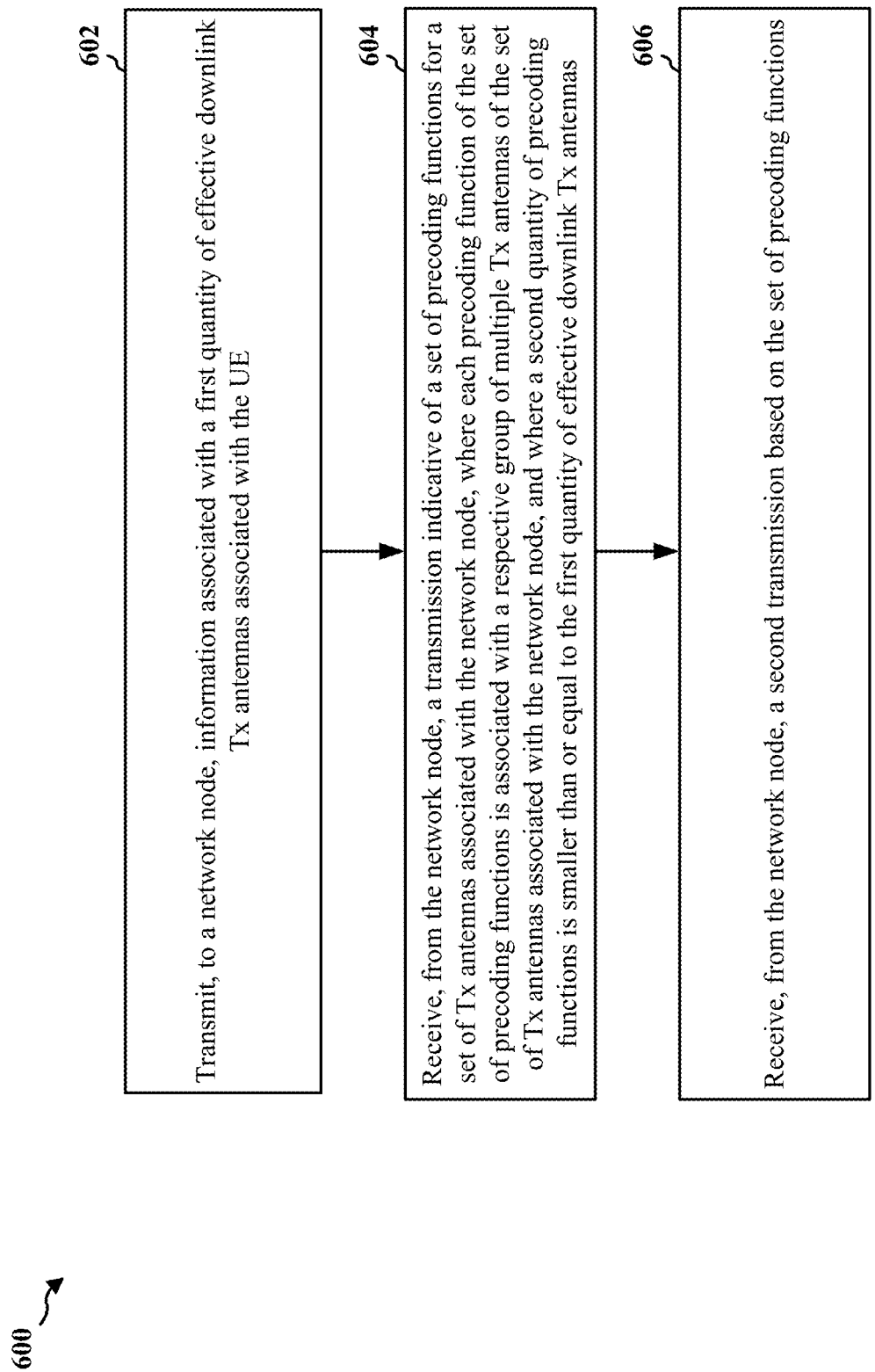
FIG. 6 is a flowchart of a method of wireless communication, in accordance with various aspects of the present disclosure.

FIG. 6 is a flowchart 600 of a method of wireless communication. The method may be performed by a UE (e.g., the UE 104; the apparatus 1004). The method may facilitate grouping of Tx antennas at the network node to enable power reduction at the UE.

At 602, the UE may transmit, to a network node, information associated with a first quantity of effective downlink Tx antennas associated with the UE. For example, the UE 502 may transmit, to a network node 504, information (e.g., in 510) associated with a first quantity of effective downlink Tx antennas associated with the UE. In some aspects, 602 may be performed by grouping component 198.

At 604, the UE may receive, from the network node, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. For example, the UE 502 may receive, from the network node, a transmission (e.g., 514) indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, 604 may be performed by grouping component 198.

At 606, the UE may receive, from the network node, a second transmission based on the set of precoding functions. For example, the UE 502 may receive, from the network node, a second transmission (e.g., 516) based on the set of precoding functions. In some aspects, 606 may be performed by grouping component 198.

Figure 7:
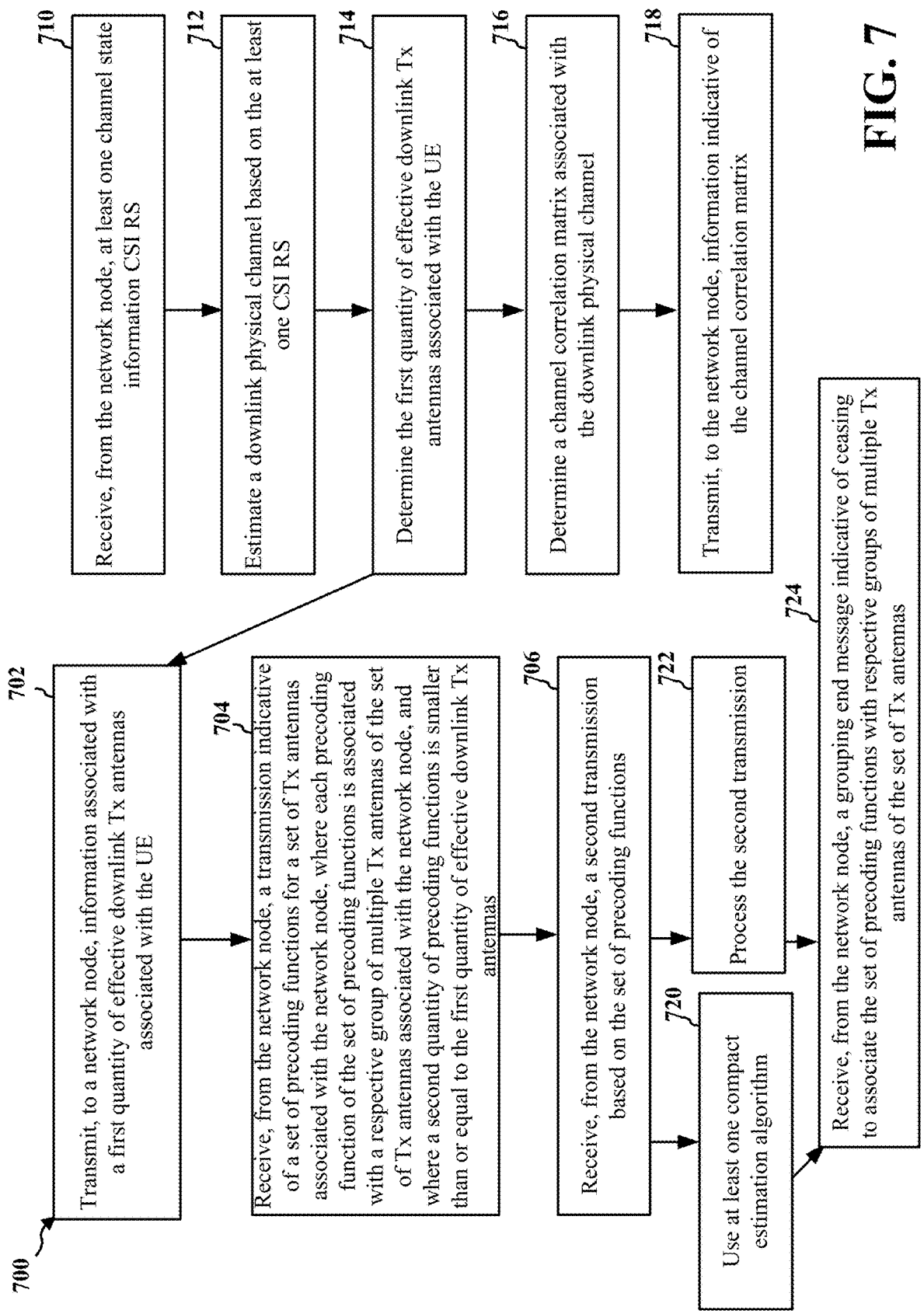
FIG. 7 is a flowchart of a method of wireless communication, in accordance with various aspects of the present disclosure.

FIG. 7 is a flowchart 700 of a method of wireless communication. The method may be performed by a UE (e.g., the UE 104; the apparatus 1004). The method may facilitate grouping of Tx antennas at the network node to enable power reduction at the UE.

At 702, the UE may transmit, to a network node, information associated with a first quantity of effective downlink Tx antennas associated with the UE. For example, the UE 502 may transmit, to a network node 504, information (e.g., in 510) associated with a first quantity of effective downlink Tx antennas associated with the UE. In some aspects, 702 may be performed by grouping component 198.

At 704, the UE may receive, from the network node, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. For example, the UE 502 may receive, from the network node, a transmission (e.g., 514) indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, 704 may be performed by grouping component 198.

At 706, the UE may receive, from the network node, a second transmission based on the set of precoding functions. For example, the UE 502 may receive, from the network node, a second transmission (e.g., 516) based on the set of precoding functions. In some aspects, 706 may be performed by grouping component 198. In some aspects, each respective Tx antenna of the multiple Tx antennas within the respective group associated with a respective precoding function is associated with a same base precoder multiplied with a respective wideband phase value. In some aspects, the respective wideband phase value is based on a correlation between a respective Tx antenna of the multiple Tx antennas within the respective group and a group leader Tx antenna of the multiple Tx antennas within the respective group. In some aspects, a respective correlation between a group leader and other Tx antennas within each respective group is maximized. In some aspects, a respective correlation between each group leader between each respective group is maximized. In some aspects, the second transmission is a PDSCH transmission.

At 710, the UE may receive, from the network node, at least one CSI RS. For example, the UE 502 may receive, from the network node, at least one CSI RS (e.g., 506). In some aspects, 710 may be performed by grouping component 198.

At 712, the UE may estimate a downlink physical channel based on the at least one CSI RS. For example, the UE 502 may estimate (e.g., 508A) a downlink physical channel based on the at least one CSI RS. In some aspects, 712 may be performed by grouping component 198.

At 714, the UE may determine the first quantity of the effective downlink Tx antennas associated with the UE. For example, the UE 502 may determine (e.g., at 508B) the first quantity of the effective downlink Tx antennas associated with the UE. In some aspects, 714 may be performed by grouping component 198.

At 716, the UE may determine a channel correlation matrix associated with the downlink physical channel. For example, the UE 502 may determine (e.g., at 508C) a channel correlation matrix associated with the downlink physical channel. In some aspects, 716 may be performed by grouping component 198.

At 718, the UE may transmit, to the network node, additional information indicative of the channel correlation matrix. For example, the UE 502 may transmit, to the network node, information (e.g., in 510) indicative of the channel correlation matrix. In some aspects, 718 may be performed by grouping component 198. In some aspects, the respective group of multiple Tx antennas is based on the channel correlation matrix.

In some aspects, the respective group of multiple Tx antennas is based on a correlation within the respective group. In some aspects, the transmission indicative of the set of precoding functions is further indicative of a timing where the set of precoding functions would be effective.

At 720, the UE may use at least one compact estimation algorithm based on the set of precoding functions and respective groups of multiple Tx antennas associated with the set of precoding functions. For example, the UE 502 may use (e.g., at 518) at least one compact estimation algorithm based on the set of precoding functions and respective groups of multiple Tx antennas associated with the set of precoding functions. In some aspects, 720 may be performed by grouping component 198.

At 722, the UE may process the second transmission based on a digital post distortion algorithm, the set of precoding functions, and an association between each precoding function in the set of precoding functions and the respective group of multiple Tx antennas. For example, the UE 502 may process the second transmission based on a digital post distortion algorithm, the set of precoding functions, and an association between each precoding function in the set of precoding functions and the respective group of multiple Tx antennas. In some aspects, 722 may be performed by grouping component 198.

At 724, the UE may receive, from the network node, a grouping end message indicative of ceasing to associate the set of precoding functions with respective groups of multiple Tx antennas of the set of Tx antennas. For example, the UE 502 may receive, from the network node, a grouping end message (e.g., 520) indicative of ceasing to associate the set of precoding functions with respective groups of multiple Tx antennas of the set of Tx antennas. In some aspects, 724 may be performed by grouping component 198.

Figure 8:
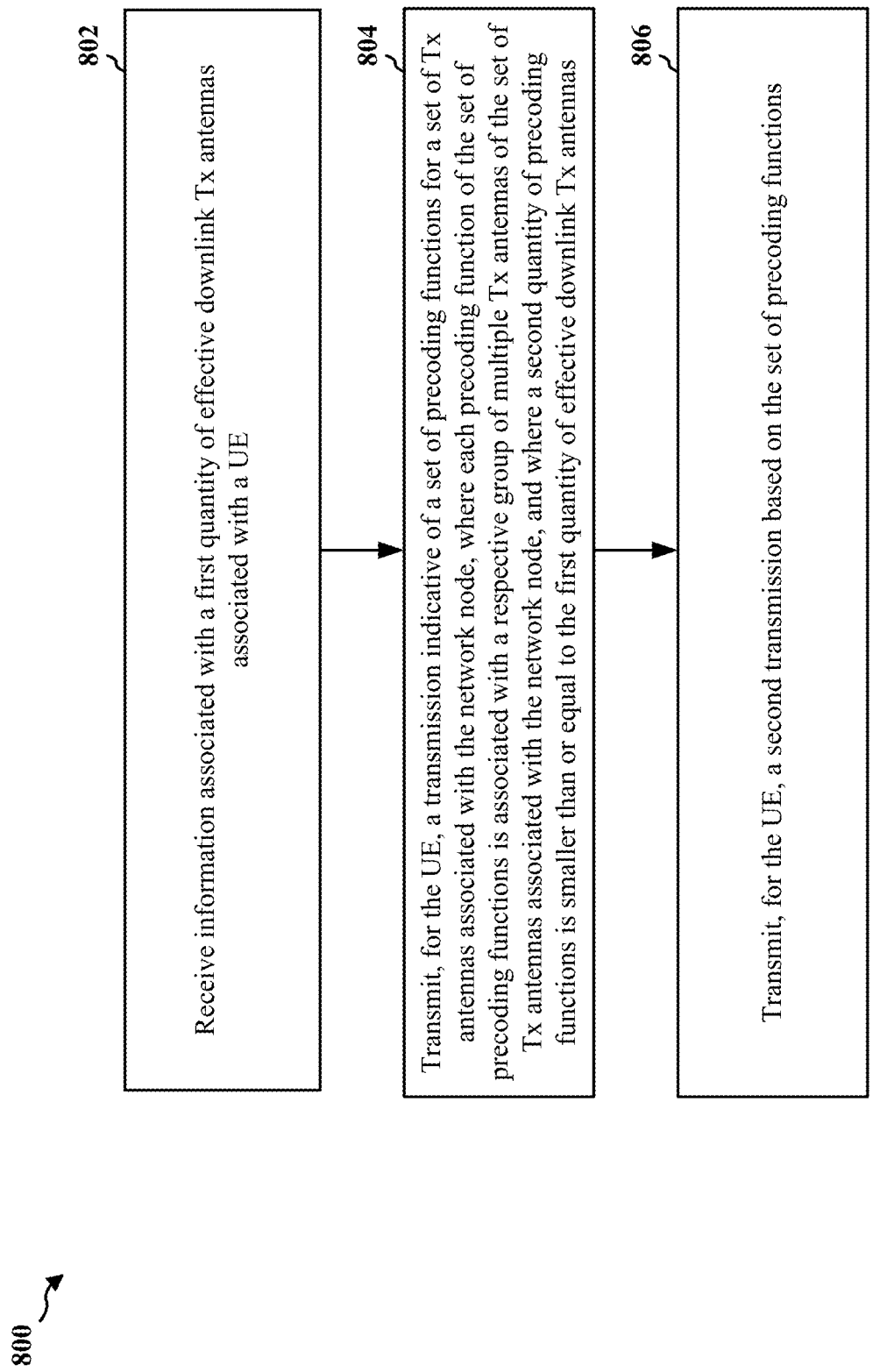
FIG. 8 is a flowchart of a method of wireless communication, in accordance with various aspects of the present disclosure.

FIG. 8 is a flowchart 800 of a method of wireless communication. The method may be performed by a network node (e.g., the base station 102, the network entity 1002, the network entity 1102). The method may facilitate grouping of Tx antennas at the network node to enable power reduction at the UE.

At 802, the network node may receive information associated with a first quantity of effective downlink Tx antennas associated with a UE. For example, the network node 504 may receive information (e.g., in 510) associated with a first quantity of effective downlink Tx antennas associated with a UE (e.g., 502). In some aspects, 802 may be performed by grouping component 199.

At 804, the network node may transmit, for the UE, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. For example, the network node 504 may transmit, for the UE 502, a transmission (e.g., 514) indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, 804 may be performed by grouping component 199. In some aspects, the transmission indicative of the set of precoding functions is further indicative of a timing where the set of precoding functions would be effective. In some aspects, each respective Tx antenna of the multiple Tx antennas within the respective group associated with a respective precoding function is associated with a same base precoder multiplied with a respective wideband phase value. In some aspects, the respective wideband phase value is based on a correlation between a respective Tx antenna of the multiple Tx antennas within the respective group and a group leader Tx antenna of the multiple Tx antennas within the respective group. In some aspects, a respective correlation between a group leader and other Tx antennas within each respective group is maximized. In some aspects, a respective correlation between each group leader between each respective group is maximized.

At 806, the network node may transmit, for the UE, a second transmission based on the set of precoding functions. For example, the network node 504 may transmit, for the UE, a second transmission (e.g., 516) based on the set of precoding functions. In some aspects, 806 may be performed by grouping component 199. In some aspects, the second transmission is a PDSCH transmission.

Figure 9:
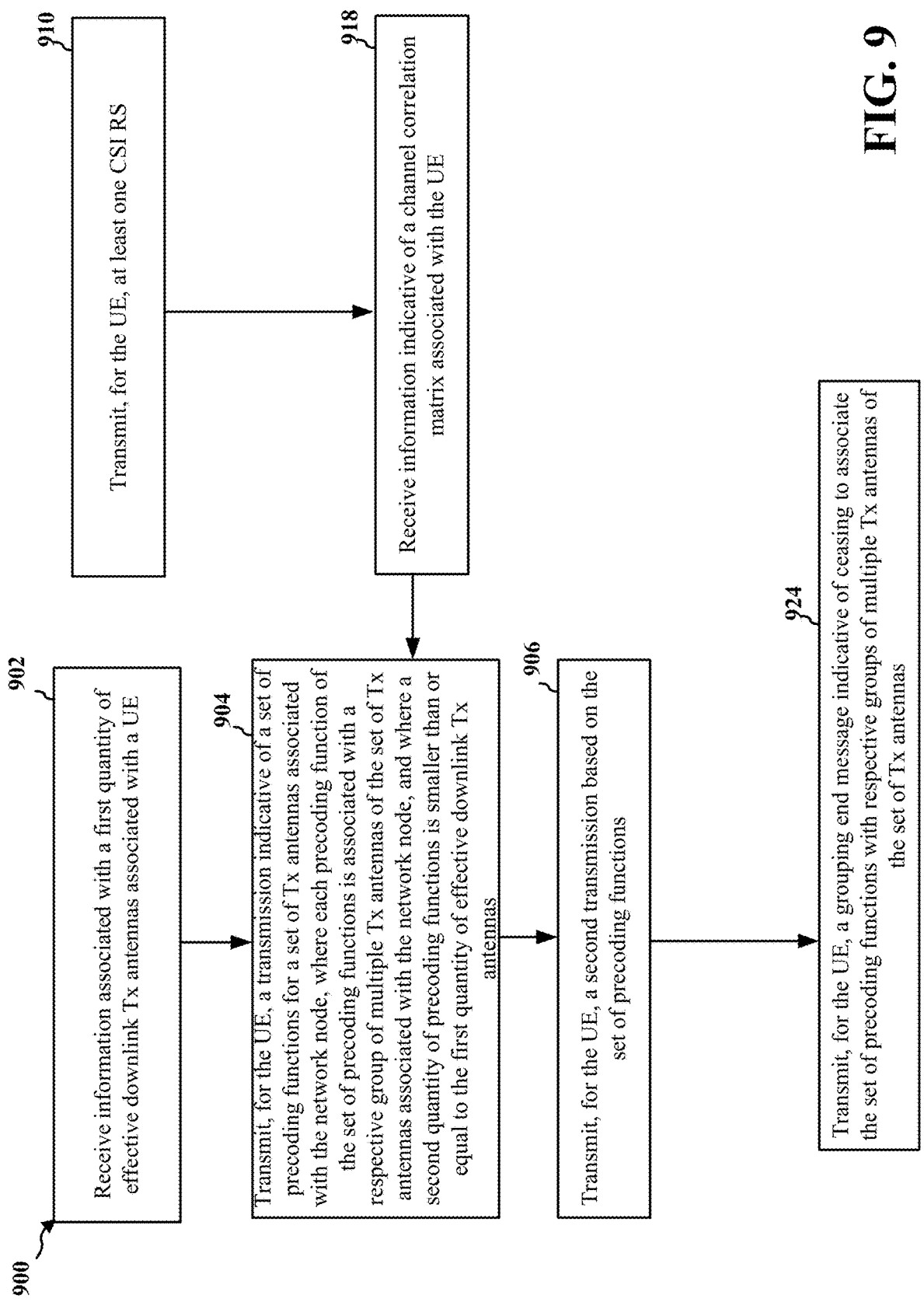
FIG. 9 is a flowchart of a method of wireless communication, in accordance with various aspects of the present disclosure.

FIG. 9 is a flowchart 900 of a method of wireless communication. The method may be performed by a network node (e.g., the base station 102, the network entity 1002, the network entity 1102). The method may facilitate grouping of Tx antennas at the network node to enable power reduction at the UE.

At 902, the network node may receive information associated with a first quantity of effective downlink Tx antennas associated with a UE. For example, the network node 504 may receive information (e.g., in 510) associated with a first quantity of effective downlink Tx antennas associated with a UE (e.g., 502). In some aspects, 902 may be performed by grouping component 199.

At 904, the network node may transmit, for the UE, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. For example, the network node 504 may transmit, for the UE 502, a transmission (e.g., 514) indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, 904 may be performed by grouping component 199. In some aspects, the transmission indicative of the set of precoding functions is further indicative of a timing where the set of precoding functions would be effective. In some aspects, each respective Tx antenna of the multiple Tx antennas within the respective group associated with a respective precoding function is associated with a same base precoder multiplied with a respective wideband phase value. In some aspects, the respective wideband phase value is based on a correlation between a respective Tx antenna of the multiple Tx antennas within the respective group and a group leader Tx antenna of the multiple Tx antennas within the respective group. In some aspects, a respective correlation between a group leader and other Tx antennas within each respective group is maximized. In some aspects, a respective correlation between each group leader between each respective group is maximized.

At 906, the network node may transmit, for the UE, a second transmission based on the set of precoding functions. For example, the network node 504 may transmit, for the UE, a second transmission (e.g., 516) based on the set of precoding functions. In some aspects, 906 may be performed by grouping component 199. In some aspects, the second transmission is a PDSCH transmission.

In some aspects, each respective Tx antenna of the multiple Tx antennas within the respective group associated with a respective precoding function is associated with a same base precoder multiplied with a respective wideband phase value.

At 910, the network node may transmit, for the UE, at least one CSI RS. For example, the network node 504 may transmit, for the UE, at least one CSI RS (e.g., 506). In some aspects, 910 may be performed by grouping component 199.

At 918, the network node may receive information indicative of a channel correlation matrix associated with the UE. For example, the network node 504 may receive information (e.g., in 510) indicative of a channel correlation matrix associated with the UE. In some aspects, 918 may be performed by grouping component 199. In some aspects, the respective group of multiple Tx antennas is based on the channel correlation matrix. In some aspects, the respective group of multiple Tx antennas is based on a correlation within the respective group.

At 924, the network node may transmit, for the UE, a grouping end message indicative of ceasing to associate the set of precoding functions with respective groups of multiple Tx antennas of the set of Tx antennas. For example, the network node 504 may transmit, for the UE, a grouping end message (e.g., 520) indicative of ceasing to associate the set of precoding functions with respective groups of multiple Tx antennas of the set of Tx antennas. In some aspects, 924 may be performed by grouping component 199.

Figure 10:
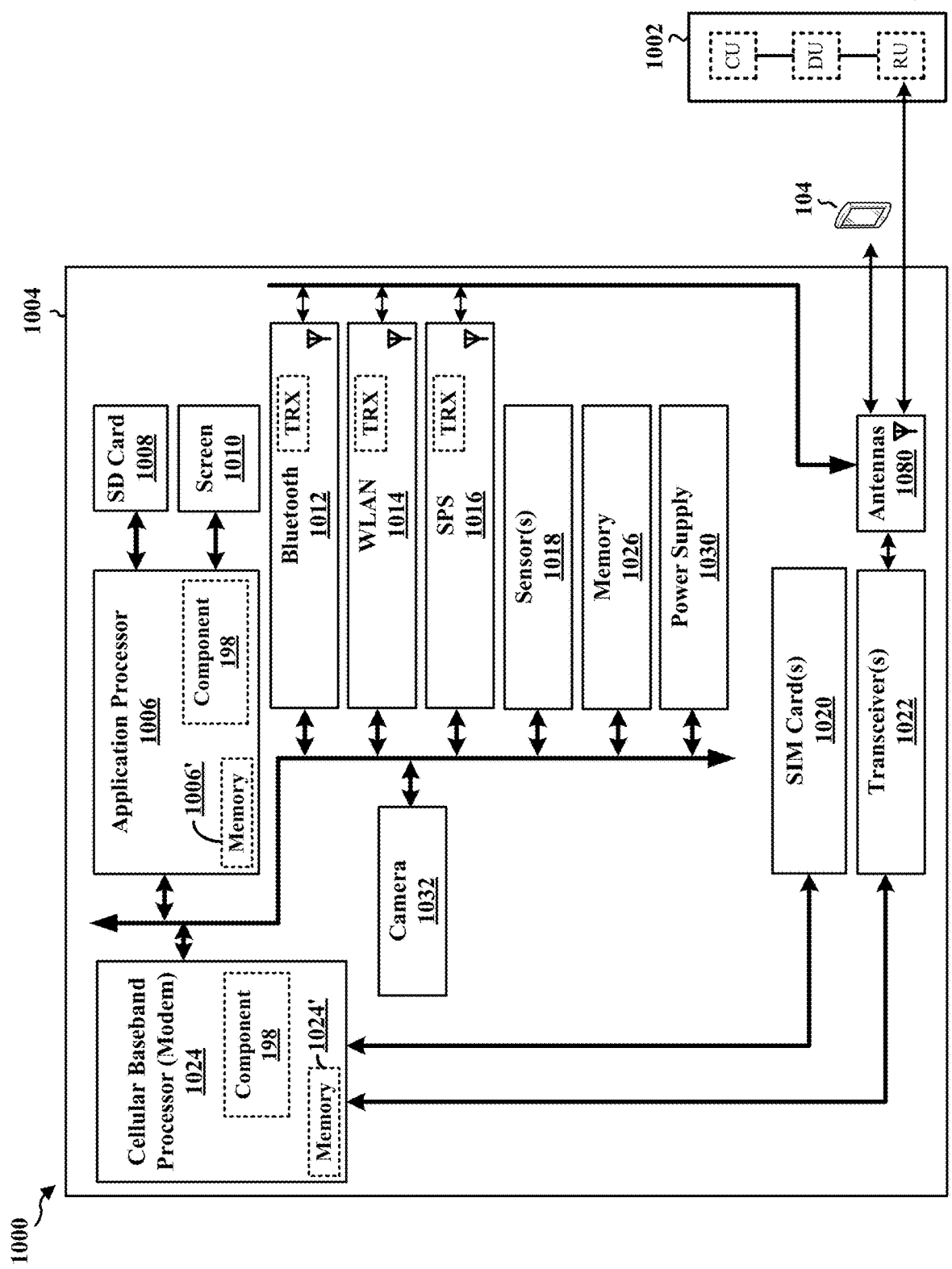
FIG. 10 is a diagram illustrating an example of a hardware implementation for an example apparatus and/or network entity, in accordance with various aspects of the present disclosure.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include at least one cellular baseband processor 1024 (also referred to as a modem) coupled to one or more transceivers 1022 (e.g., cellular RF transceiver). The cellular baseband processor(s) 1024 may include at least one on-chip memory 1024'. In some aspects, the apparatus 1004 may further include one or more subscriber identity modules (SIM) cards 1020 and at least one application processor 1006 coupled to a secure digital (SD) card 1008 and a screen 1010. The application processor(s) 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor(s) 1024 communicates through the transceiver(s) 1022 via one or more antennas 1080 with the UE 104 and/or with an RU associated with a network entity 1002. The cellular baseband processor(s) 1024 and the application processor(s) 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor(s) 1024 and the application processor(s) 1006 are each responsible for general processing, including the execution of software stored on the computer-readable medium/memory. The software, when executed by the cellular baseband processor(s) 1024/application processor(s) 1006, causes the cellular baseband processor(s) 1024/application processor(s) 1006 to perform the various functions described supra. The computer-readable medium/memory may also be used for storing data that is manipulated by the cellular baseband processor(s) 1024/application processor(s) 1006 when executing software. The cellular baseband processor(s) 1024/application processor(s) 1006 may be a component of the UE 350 and may include the at least one memory 360 and/or at least one of the TX processor 368, the RX processor 356, and the controller/processor 359. In one configuration, the apparatus 1004 may be at least one processor chip (modem and/or application) and include just the cellular baseband processor(s) 1024 and/or the application processor(s) 1006, and in another configuration, the apparatus 1004 may be the entire UE (e.g., see UE 350 of FIG. 3) and include the additional modules of the apparatus 1004.

As discussed supra, the grouping component 198 may be configured to transmit, to a network node, information associated with a first quantity of effective downlink Tx antennas associated with the UE. In some aspects, the grouping component 198 may be further configured to receive, from the network node, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, the grouping component 198 may be further configured to receive, from the network node, a second transmission based on the set of precoding functions. The grouping component 198 may be within the cellular baseband processor(s) 1024, the application processor(s) 1006, or both the cellular baseband processor(s) 1024 and the application processor(s) 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1004 may include a variety of components configured for various functions. In one configuration, the apparatus 1004, and in particular the cellular baseband processor(s) 1024 and/or the application processor(s) 1006, may include means for transmitting, to a network node, information associated with a first quantity of effective downlink Tx antennas associated with the UE. In some aspects, the apparatus 1004 may include means for receiving, from the network node, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, the apparatus 1004 may include means for receiving, from the network node, a second transmission based on the set of precoding functions. In some aspects, the apparatus 1004 may include means for receiving, from the network node, at least one CSI RS. In some aspects, the apparatus 1004 may include means for estimating a downlink physical channel based on the at least one CSI RS. In some aspects, the apparatus 1004 may include means for determining the first quantity of the effective downlink Tx antennas associated with the UE. In some aspects, the apparatus 1004 may include means for determining a channel correlation matrix associated with the downlink physical channel. In some aspects, the apparatus 1004 may include means for transmitting, to the network node, additional information indicative of the channel correlation matrix. In some aspects, the apparatus 1004 may include means for receiving, from the network node, a grouping end message indicative of ceasing to associate the set of precoding functions with respective groups of multiple Tx antennas of the set of Tx antennas. In some aspects, the apparatus 1004 may include means for using at least one compact estimation algorithm based on the set of precoding functions and respective groups of multiple Tx antennas associated with the set of precoding functions. In some aspects, the apparatus 1004 may include means for processing the second transmission based on a digital post distortion algorithm, the set of precoding functions, and an association between each precoding function in the set of precoding functions and the respective group of multiple Tx antennas. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
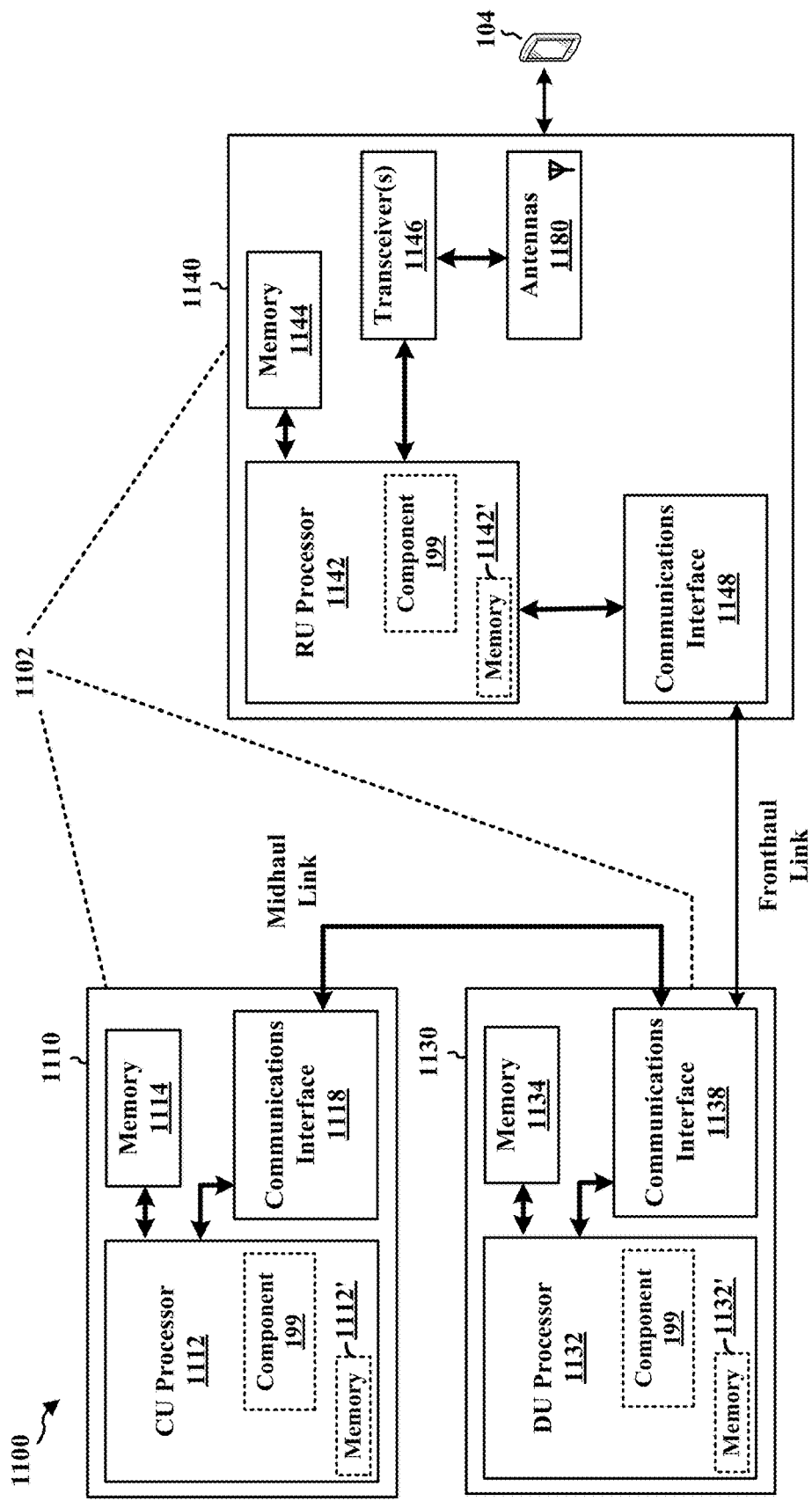
FIG. 11 is a diagram illustrating an example of a hardware implementation for an example network entity, in accordance with various aspects of the present disclosure.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include at least one CU processor 1112. The CU processor(s) 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include at least one DU processor 1132. The DU processor(s) 1132 may include on-chip memory 1132'. In some aspects, the DU 1130 may further include additional memory modules 1134 and a communications interface 1138. The DU 1130 communicates with the RU 1140 through a fronthaul link. The RU 1140 may include at least one RU processor 1142. The RU processor(s) 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the grouping component 199 may be configured to receive information associated with a first quantity of effective downlink Tx antennas associated with a UE. In some aspects, the grouping component 199 may be further configured to transmit, for the UE, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, the grouping component 199 may be further configured to transmit, for the UE, a second transmission based on the set of precoding functions. The grouping component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1102 may include a variety of components configured for various functions. In one configuration, the network entity 1102 may include means for receiving information associated with a first quantity of effective downlink Tx antennas associated with a UE. In some aspects, the network entity 1102 may include means for transmitting, for the UE, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas. In some aspects, the network entity 1102 may include means for transmitting, for the UE, a second transmission based on the set of precoding functions. In some aspects, the network entity 1102 may include means for transmitting, for the UE, at least one channel state information CSI RS. In some aspects, the network entity 1102 may include means for receiving information indicative of a channel correlation matrix associated with the UE. In some aspects, the network entity 1102 may include means for transmitting, for the UE, a grouping end message indicative of ceasing to associate the set of precoding functions with respective groups of multiple Tx antennas of the set of Tx antennas. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication performed by a user equipment (UE), including: transmitting, to a network node, information associated with a first quantity of effective downlink transmit (Tx) antennas associated with the UE; receiving, from the network node, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas; and receiving, from the network node, a second transmission based on the set of precoding functions.

Aspect 2 is the method of aspect 1, further including: receiving, from the network node, at least one channel state information (CSI) reference signal (CSI RS); estimating a downlink physical channel based on the at least one CSI RS; and determining the first quantity of the effective downlink Tx antennas associated with the UE.

Aspect 3 is the method of aspect 2, further including: determining a channel correlation matrix associated with the downlink physical channel; and transmitting, to the network node, additional information indicative of the channel correlation matrix.

Aspect 4 is the method of aspect 3, where the respective group of multiple Tx antennas is based on the channel correlation matrix.

Aspect 5 is the method of any of aspects 1-4, where the respective group of multiple Tx antennas is based on a correlation within the respective group.

Aspect 6 is the method of any of aspects 1-5, where the transmission indicative of the set of precoding functions is further indicative of a timing where the set of precoding functions would be effective.

Aspect 7 is the method of any of aspects 1-6, further including: receiving, from the network node, a grouping end message indicative of ceasing to associate the set of precoding functions with respective groups of multiple Tx antennas of the set of Tx antennas.

Aspect 8 is the method of any of aspects 1-7, further including: using at least one compact estimation algorithm based on the set of precoding functions and respective groups of multiple Tx antennas associated with the set of precoding functions.

Aspect 9 is the method of any of aspects 1-8, where each respective Tx antenna of the multiple Tx antennas within the respective group associated with a respective precoding function is associated with a same base precoder multiplied with a respective wideband phase value.

Aspect 10 is the method of aspect 9, where the respective wideband phase value is based on a correlation between a respective Tx antenna of the multiple Tx antennas within the respective group and a group leader Tx antenna of the multiple Tx antennas within the respective group.

Aspect 11 is the method of aspect 10, where a respective correlation between a group leader and other Tx antennas within each respective group is maximized.

Aspect 12 is the method of aspect 10, where a respective correlation between each group leader between each respective group is maximized.

Aspect 13 is the method of any of aspects 1-12, where the second transmission is a physical downlink shared channel (PDSCH) transmission.

Aspect 14 is the method of aspect 1, further including: processing the second transmission based on a digital post distortion algorithm, the set of precoding functions, and an association between each precoding function in the set of precoding functions and the respective group of multiple Tx antennas.

Aspect 15 is a method for wireless communication performed by a network node, including: receiving information associated with a first quantity of effective downlink transmit (Tx) antennas associated with a user equipment (UE); transmitting, for the UE, a transmission indicative of a set of precoding functions for a set of Tx antennas associated with the network node, where each precoding function of the set of precoding functions is associated with a respective group of multiple Tx antennas of the set of Tx antennas associated with the network node, and where a second quantity of precoding functions is smaller than or equal to the first quantity of the effective downlink Tx antennas; and transmitting, for the UE, a second transmission based on the set of precoding functions.

Aspect 16 is the method of aspect 15, further including: transmitting, for the UE, at least one channel state information (CSI) reference signal (CSI RS).

Aspect 17 is the method of aspect 16, further including: receiving additional information indicative of a channel correlation matrix associated with the UE.

Aspect 18 is the method of aspect 17, where the respective group of multiple Tx antennas is based on the channel correlation matrix.

Aspect 19 is the method of any of aspects 15-18, where the respective group of multiple Tx antennas is based on a correlation within the respective group.

Aspect 20 is the method of any of aspects 15-19, where the transmission indicative of the set of precoding functions is further indicative of a timing where the set of precoding functions would be effective.

Aspect 21 is the method of any of aspects 15-20, further including: transmitting, for the UE, a grouping end message indicative of ceasing to associate the set of precoding functions with respective groups of multiple Tx antennas of the set of Tx antennas.

Aspect 22 is the method of any of aspects 15-21, where each respective Tx antenna of the multiple Tx antennas within the respective group associated with a respective precoding function is associated with a same base precoder multiplied with a respective wideband phase value.

Aspect 23 is the method of aspect 22, where the respective wideband phase value is based on a correlation between a respective Tx antenna of the multiple Tx antennas within the respective group and a group leader Tx antenna of the multiple Tx antennas within the respective group.

Aspect 24 is the method of aspect 23, where a respective correlation between a group leader and other Tx antennas within each respective group is maximized.

Aspect 25 is the method of aspect 23, where a respective correlation between each group leader between each respective group is maximized.

Aspect 26 is the method of any of aspects 15-25, where the second transmission is a physical downlink shared channel (PDSCH) transmission.

Aspect 27 is an apparatus for wireless communication at a device including at least one memory and at least one processor coupled to the at least one memory and, based at least in part on information stored in the memory, the at least one processor is configured to implement any of aspects 1 to 14.

Aspect 28 is the apparatus of aspect 27, further including one or more transceivers or one or more antennas coupled to the at least one processor.

Aspect 29 is an apparatus for wireless communication at a device including means for implementing any of aspects 1 to 14.

Aspect 30 is a computer-readable medium (e.g., a non-transitory computer-readable medium) storing computer executable code, where the code when executed by at least one processor causes the at least one processor to implement any of aspects 1 to 14.

Aspect 31 is an apparatus for wireless communication at a device including at least one memory and at least one processor coupled to the at least one memory and, based at least in part on information stored in the memory, the at least one processor is configured to implement any of aspects 15 to 26.

Aspect 32 is the apparatus of aspect 31, further including one or more transceivers or one or more antennas coupled to the at least one processor.

Aspect 33 is an apparatus for wireless communication at a device including means for implementing any of aspects 15 to 26.

Aspect 34 is a computer-readable medium (e.g., a non-transitory computer-readable medium) storing computer executable code, where the code when executed by at least one processor causes the at least one processor to implement any of aspects 15 to 26.

What is claimed is:

1. An apparatus for wireless communication at a user equipment (UE), comprising:
   at least one memory; and
   at least one processor coupled to the at least one memory and, based at least in part on stored information that is stored in the at least one memory, the at least one processor, is configured to cause the apparatus to:
   transmit, to a network node, information associated with a first quantity of effective downlink transmit (Tx) antennas associated with the UE;
   receive, from the network node, a transmission indicative of a set of precoding functions for a set of Tx antennas associated with the network node, wherein each precoding function of the set of precoding functions is associated with a respective group of multiple Tx antennas of the set of Tx antennas associated with the network node, and wherein a second quantity of precoding functions is smaller than or equal to the first quantity of the effective downlink Tx antennas, wherein each respective Tx antenna of the multiple Tx antennas within the respective group associated with a respective precoding function is associated with a same base precoder multiplied with a respective wideband phase value; and
   receive, from the network node, a second transmission based on the set of precoding functions.

2. The apparatus of claim 1, wherein the at least one processor is further configured to cause the apparatus to:
   receive, from the network node, at least one channel state information (CSI) reference signal (CSI RS);
   estimate a downlink physical channel based on the at least one CSI RS; and
   determine the first quantity of the effective downlink Tx antennas associated with the UE.

3. The apparatus of claim 2, wherein the at least one processor is further configured to cause the apparatus to:
   determine a channel correlation matrix associated with the downlink physical channel; and
   transmit, to the network node, additional information indicative of the channel correlation matrix.

4. The apparatus of claim 3, wherein the respective group of multiple Tx antennas is based on the channel correlation matrix.

5. The apparatus of claim 1, wherein the respective group of multiple Tx antennas is based on a correlation within the respective group.

6. The apparatus of claim 1, wherein the transmission indicative of the set of precoding functions is further indicative of a timing where the set of precoding functions would be effective.

7. The apparatus of claim 1, wherein the at least one processor is further configured to cause the apparatus to:
receive, from the network node, a grouping end message indicative of ceasing to associate the set of precoding functions with respective groups of multiple Tx antennas of the set of Tx antennas.

8. The apparatus of claim 1, wherein the at least one processor is further configured to cause the apparatus to:
use at least one compact estimation algorithm based on the set of precoding functions and respective groups of multiple Tx antennas associated with the set of precoding functions.

9. The apparatus of claim 1, wherein the respective wideband phase value is based on a correlation between a respective Tx antenna of the multiple Tx antennas within the respective group and a group leader Tx antenna of the multiple Tx antennas within the respective group.

10. The apparatus of claim 9, wherein a respective correlation between a group leader and other Tx antennas within each respective group is maximized.

11. The apparatus of claim 9, wherein a respective correlation between each group leader between each respective group is maximized.

12. The apparatus of claim 1, wherein the second transmission is a physical downlink shared channel (PDSCH) transmission.

13. The apparatus of claim 1, wherein the at least one processor is further configured to cause the apparatus to:
process the second transmission based on a digital post distortion algorithm, the set of precoding functions, and an association between each precoding function in the set of precoding functions and the respective group of multiple Tx antennas.

14. An apparatus for wireless communication at a network node, comprising:
at least one memory; and
at least one processor coupled to the at least one memory and, based at least in part on stored information that is stored in the at least one memory, the at least one processor; is configured to cause the apparatus to:
receive information associated with a first quantity of effective downlink transmit (Tx) antennas associated with a user equipment (UE);
transmit, for the UE, a transmission indicative of a set of precoding functions for a set of Tx antennas associated with the network node, wherein each precoding function of the set of precoding functions is associated with a respective group of multiple Tx antennas of the set of Tx antennas associated with the network node, and wherein a second quantity of precoding functions is smaller than or equal to the first quantity of the effective downlink Tx antennas, wherein each respective Tx antenna of the multiple Tx antennas within the respective group associated with a respective precoding function is associated with a same base precoder multiplied with a respective wideband phase value; and
transmit, for the UE, a second transmission based on the set of precoding functions.

15. The apparatus of claim 14, wherein the at least one processor is further configured to cause the apparatus to:
transmit, for the UE, at least one channel state information (CSI) reference signal (CSI RS).

16. The apparatus of claim 15, wherein the at least one processor is further configured to cause the apparatus to:
receive additional information indicative of a channel correlation matrix associated with the UE.

17. The apparatus of claim 16, wherein the respective group of multiple Tx antennas is based on the channel correlation matrix.

18. The apparatus of claim 14, wherein the respective group of multiple Tx antennas is based on a correlation within the respective group.

19. The apparatus of claim 14, wherein the transmission indicative of the set of precoding functions is further indicative of a timing where the set of precoding functions would be effective.

20. The apparatus of claim 14, wherein the at least one processor is further configured to cause the apparatus to:
transmit, for the UE, a grouping end message indicative of ceasing to associate the set of precoding functions with respective groups of multiple Tx antennas of the set of Tx antennas.

21. The apparatus of claim 14, wherein the respective wideband phase value is based on a correlation between a respective Tx antenna of the multiple Tx antennas within the respective group and a group leader Tx antenna of the multiple Tx antennas within the respective group.

22. The apparatus of claim 21, wherein a respective correlation between a group leader and other Tx antennas within each respective group is maximized.

23. The apparatus of claim 21, wherein a respective correlation between each group leader between each respective group is maximized.

24. The apparatus of claim 14, wherein the second transmission is a physical downlink shared channel (PDSCH) transmission.

25. A method for wireless communication performed by a user equipment (UE), comprising:
transmitting, to a network node, information associated with a first quantity of effective downlink transmit (Tx) antennas associated with the UE;
receiving, from the network node, a transmission indicative of a set of precoding functions for a set of Tx antennas associated with the network node, wherein each precoding function of the set of precoding functions is associated with a respective group of multiple Tx antennas of the set of Tx antennas associated with the network node, and wherein a second quantity of precoding functions is smaller than or equal to the first quantity of the effective downlink Tx antennas, wherein each respective Tx antenna of the multiple Tx antennas within the respective group associated with a respective precoding function is associated with a same base precoder multiplied with a respective wideband phase value; and
receiving, from the network node, a second transmission based on the set of precoding functions.

26. The method of claim 25, further comprising:
receiving, from the network node, at least one channel state information (CSI) reference signal (CSI RS);
estimating a downlink physical channel based on the at least one CSI RS; and determining the first quantity of the effective downlink Tx antennas associated with the UE.

27. The method of claim 26, further comprising:
determining a channel correlation matrix associated with the downlink physical channel; and
transmitting, to the network node, additional information indicative of the channel correlation matrix.

28. A method for wireless communication performed by a network node, comprising:
receiving information associated with a first quantity of effective downlink transmit (Tx) antennas associated with a user equipment (UE);
transmitting, for the UE, a transmission indicative of a set of precoding functions for a set of Tx antennas associated with the network node, wherein each precoding function of the set of precoding functions is associated with a respective group of multiple Tx antennas of the set of Tx antennas associated with the network node, and wherein a second quantity of precoding functions is smaller than or equal to the first quantity of the effective downlink Tx antennas, wherein each respective Tx antenna of the multiple Tx antennas within the respective group associated with a respective precoding function is associated with a same base precoder multiplied with a respective wideband phase value; and
transmitting, for the UE, a second transmission based on the set of precoding functions.

* * * * *